May 27, 1958 J. COOKSON 2,836,281
CONVEYOR SYSTEM
Filed July 8, 1954 5 Sheets-Sheet 1

Inventor
Joseph Cookson
By
Bailey Stephens & Huettig
Attorneys

May 27, 1958
J. COOKSON
2,836,281
CONVEYOR SYSTEM
Filed July 8, 1954
5 Sheets-Sheet 4
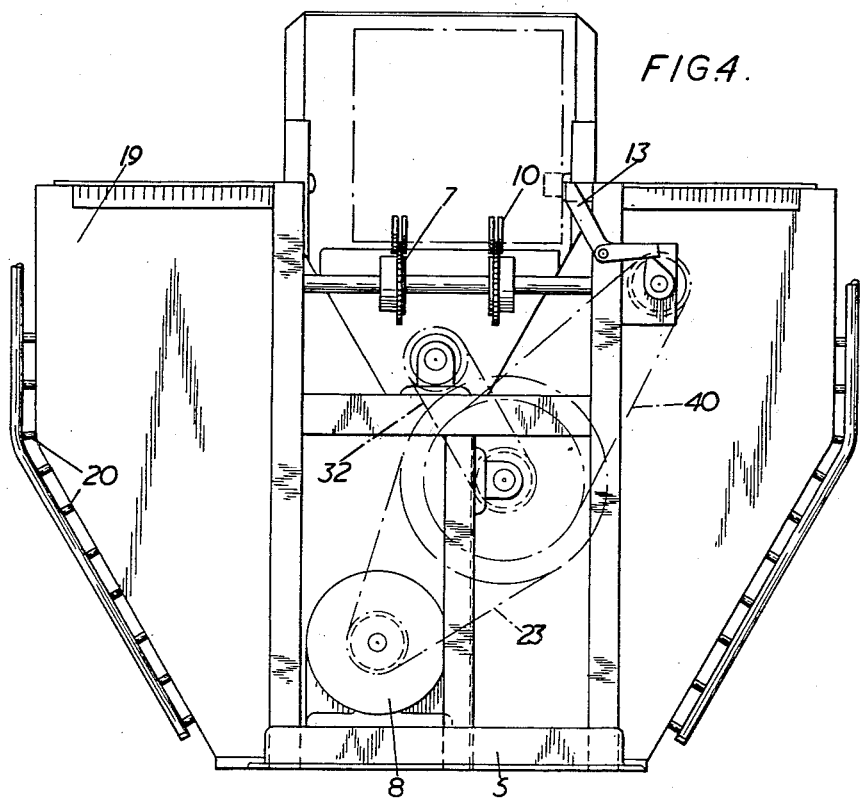
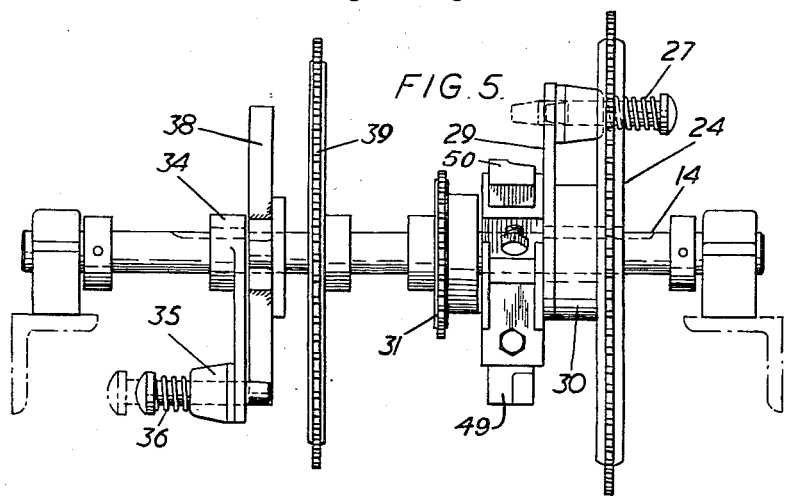
Inventor
Joseph Cookson
By
Bailey, Stephens & Huettig
Attorneys May 27, 1958  J. COOKSON  2,836,281
CONVEYOR SYSTEM Filed July 8, 1954  5 Sheets-Sheet 5

Inventor
Joseph Cookson

Figure 1:
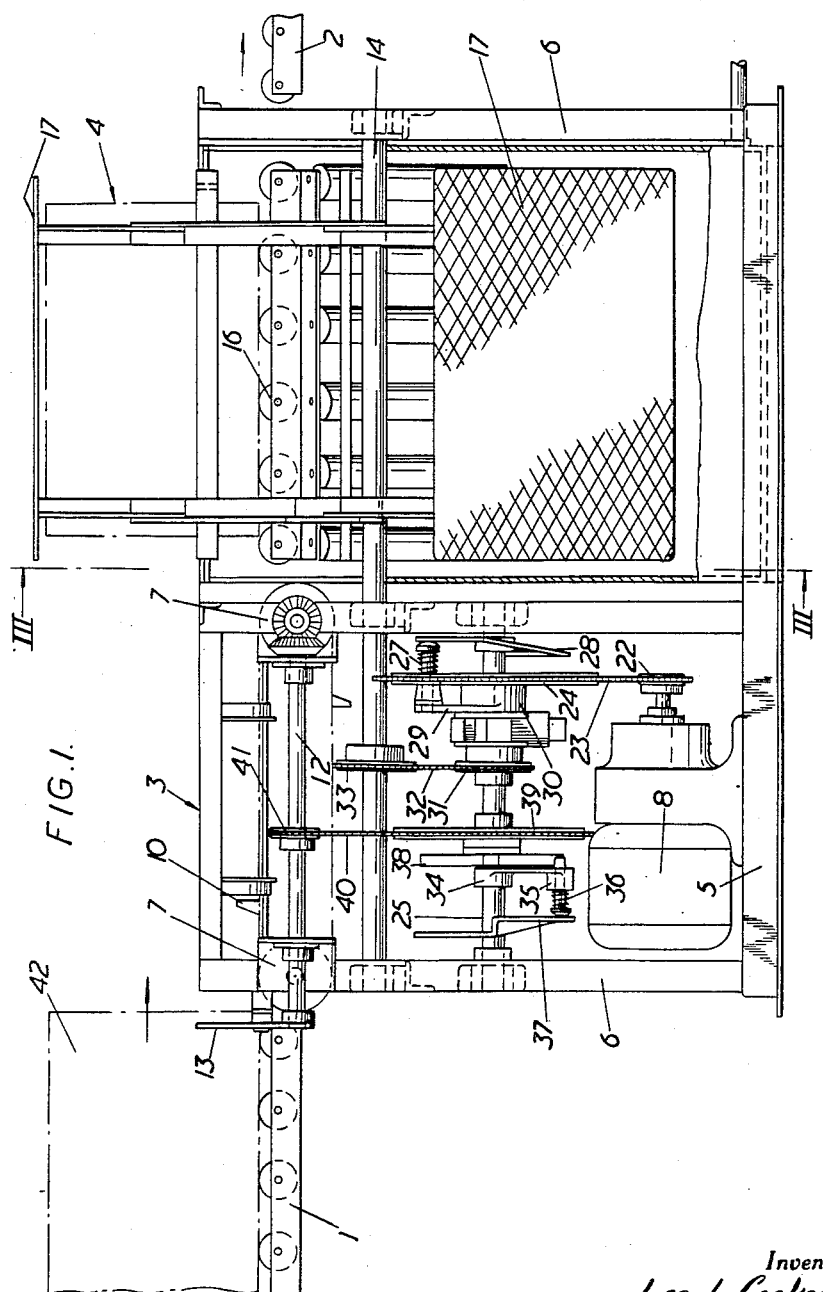
Figure 2:
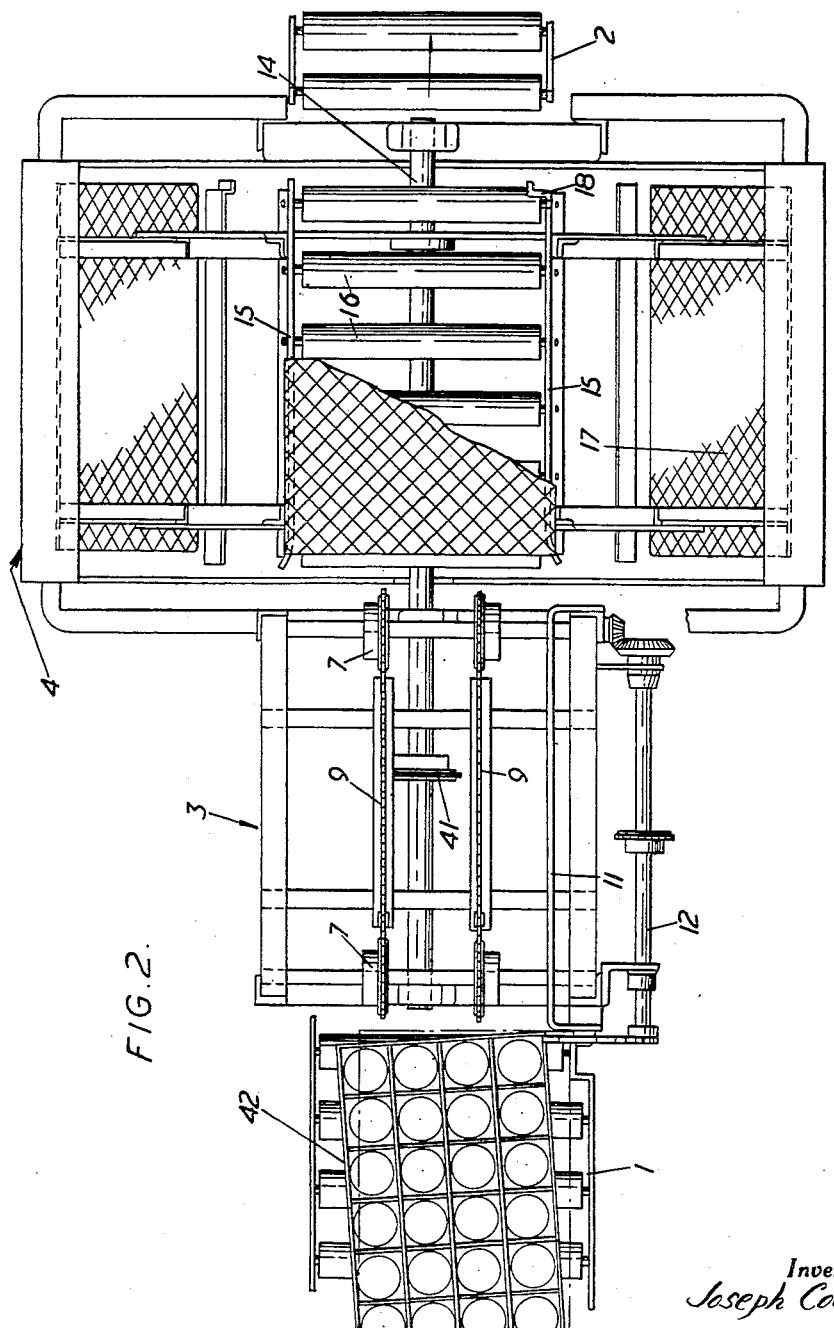

By
Bailey, Stephens & Huettig
Attorneys though as shown in Figure 1 and 2 it has the form of a mesh or grid work. It will be seen from Figure 2 that the end of one or the side walls 15 is turned inwards to form a stop 18.

United States Patent Office 2,836,281
Patented May 27, 1958

2,836,281

CONVEYOR SYSTEM

Joseph Cookson, Buckhurst Hill, England

Application July 8, 1954, Serial No. 442,036

11 Claims. (Cl. 198—33)

The invention relates to a conveyor system. In accordance with the invention a conveyor system comprises a conveyor run, a member rotatable about an axis parallel with the conveyor run, and power driven means for interrupting the flow of articles along the conveyor run and for simultaneously turning the rotatable member whilst said flow of articles is interrupted to invert the articles on the rotatable member.

Apparatus in accordance with the invention may be made in a variety of forms to suit individual purposes when it is desired to invert articles travelling along a conveyor system. Thus, for example, if the articles with which the conveyor system are to be used are crates of filled bottles of beverage, and it is desired to invert the bottles to ensure proper mixing of their contents, the power-driven rotatable member may be interposed between two aligned runs of the conveyor system, and may carry closure members to hold the bottles in place when they are inverted. These closure members may comprise plates carried by arms. If it is desired to invert empty crates for cleaning purposes the apparatus may be similar in general character but instead of providing plates as closure members for the framework carried by the rotatable member, barred or open-work frames may be so employed.

The framework is preferably slightly wider than the articles to be carried therein, e. g. crates, and is provided with side guide rails, one of which is indented so as to form an end stop for the articles located within the framework. When inverted the crates will slide sideways and so are free to travel onwards when they regain the upright position. Other forms of retaining devices may, of course, be used in the framework carried by the rotatable member.

The invention also includes a further form of apparatus in which when the articles to be carried are crates or other containers holding empty bottles or the like subsidiary containers, the contents of the crate are discharged whilst the crate is inverted on to a further conveyor run, the empty crates on recovering the erect position, passing on to a third conveyor run aligned with the first. In this case the framework carried by the rotating member may again be wider than the crate, and provided with an indented side rail whilst the closure member for the framework comprises a grid so that the bottles or other containers are held by the grid until the inverted crate slips sideways within the framework and then released.

The invention is illustrated by way of example in the accompanying drawings, in which:

Figure 1 is a side elevation and

Figure 3:
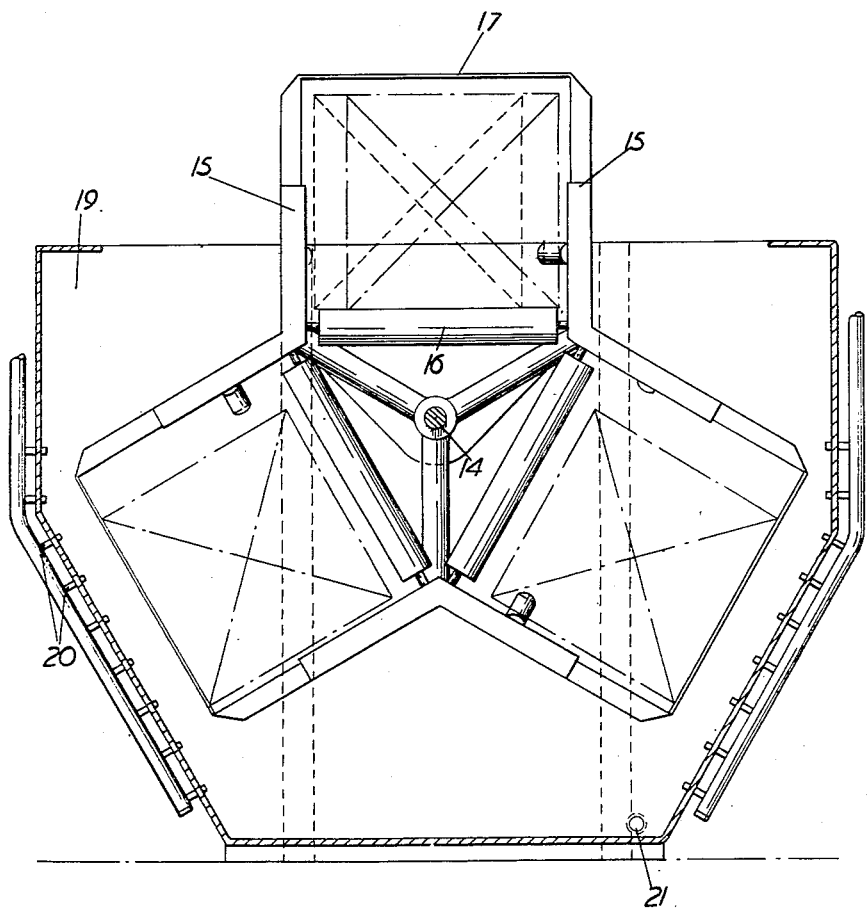
Figure 6:
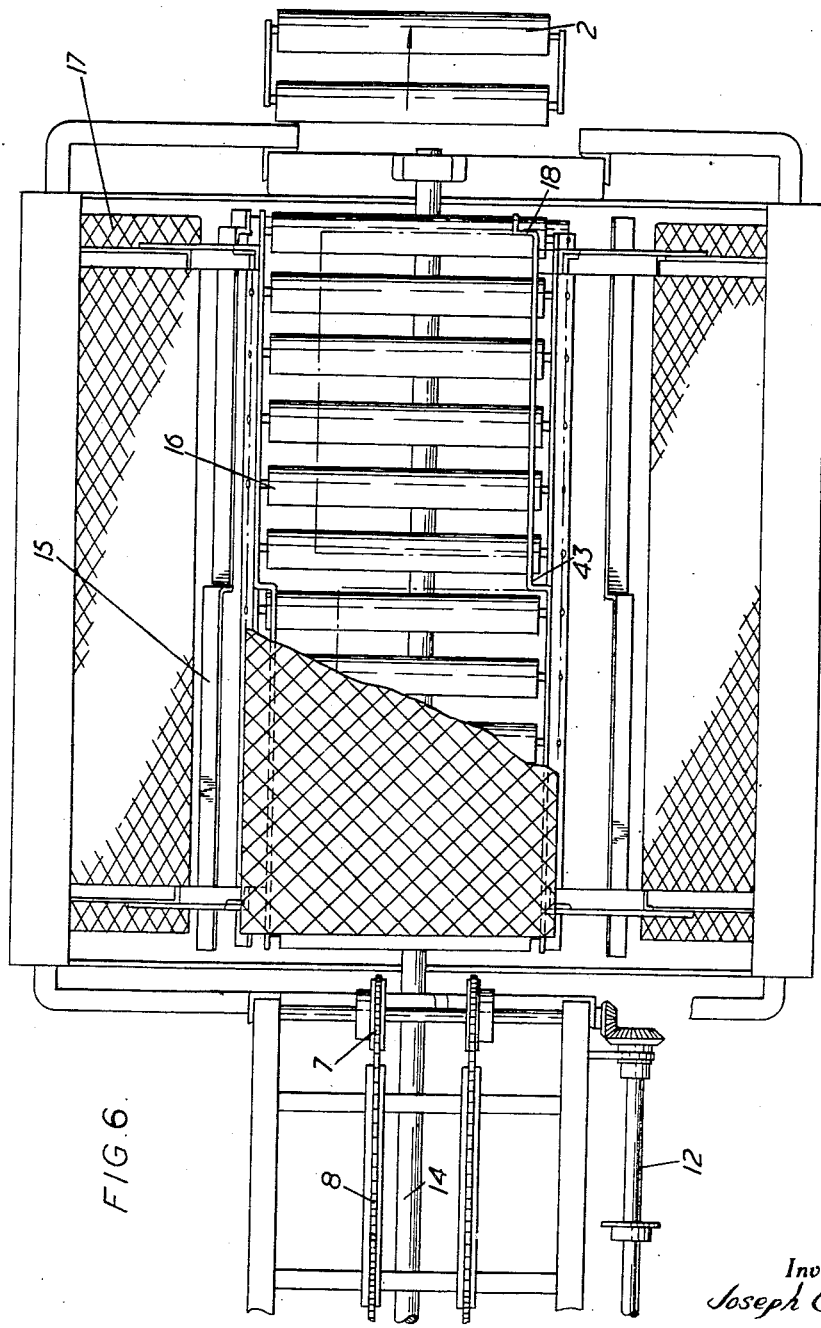

Figure 2, a plan of a conveyor system in accordance with the invention, whilst Figure 3 is a section along the line III—III of Figure 1;

Figure 4 is an end elevation with a cover plate removed;

Figure 5, a fragmentary view of the timing mechanism drawn on a larger sale, and Figure 6 shows in side elevation a modified form of rotatable carrier.

Referring to Figures 1 to 5, the mechanism is shown fitted between two runs 1 and 2 of a gravity roller conveyor track suitable for conveying full or empty bottle crates. The mechanism of the invention comprises two sections, the first generally designated 3 providing means for feeding at timed intervals a crate into the second section, generally designated 4, whereby the crate is rotated. Both sections have a common bed plate 5 upon which end uprights 6 are mounted.

The section 3 comprises a pair of sprockets 7 driven from a motor 8 through a timing and transmission system to be described later, and over which run parallel chains 9 fitted with lugs 10. The section 3 comprises a stop rail 11 at one side. A shaft 12 interposed in the transmission system for the drive to the chains 9 carries a finger 13 which rotates with the shaft 12.

The section 4 comprises a shaft 14 mounted in the uprights 6, 6 and lying parallel to the length of the conveyor runs 1 and 2, and also driven from the motor 8 through a transmission and timing system to be described later. The shaft 14 carries three compartments spaced apart at 120° each of which has side walls 15 and a bottom comprising a track of rollers 16, and a top closure 17 which may be in various forms though as shown in Figure 1 and 2 it has the form of a mesh or grid work. It will be seen from Figure 2 that the end of one or the side walls 15 is turned inwards to form a stop 18.

In the form illustrated the section 3 is adapted for cleaning empty cases and is, therefore, surrounded by a casing 19 provided with spray nozzles 20 and a drain hole 21. The illustrated form of the invention may, however, be modified according to the intended uses for the system as will be described more fully hereinafter.

The timing and transmission mechanisms whereby power from the motor 8 is transmitted intermittently at timed intervals to the shafts 12 and 14 will now be described. This feature is illustrated in Figures 1 and 5.

The motor 8 has a sprocket 22 from which a chain 23 transmits power to a sprocket 24 mounted on a countershaft 25 and fixed thereto. Secured to the sprocket 24 is a spring loaded plunger 27, the head of which engages a stationary cam plate 28 so that during rotation of the sprocket 24 the plunger 27 at one stage is pressed in by the cam plate and at another stage is retracted under spring action. When pressed in, the end remote from the head of the plunger projects and engages a finger 29 fixed to a collar 30 which is free to rotate on the shaft 25 and which carries a sprocket 31 from which a chain 32 transmits power to a second sprocket 33 on the shaft 14. The gearing provided by the chains 23, 32 and sprockets 21, 24, 31, 33 is such that during each rotation of the shaft 25 the shaft 14 is caused to rotate through one stage of 120°. Fixed to the shaft 25 is a collar 34 carrying an arm 35 in which is mounted a second spring loaded plunger 36 the head of which engages a second stationary cam plate 37 so that the plunger 36 is automatically advanced and retracted during each rotation of the shaft 25. When advanced the plunger engages a hole in a disc 38 which is fixed to a collar free to rotate on the shaft and which carries a sprocket 39 through which drive is transmitted via a chain 40 to a sprocket 41 situated on the shaft 12 from which the sprockets 7 are driven through spur gearing. The collar 34 and sprocket 24 are so positioned on the shaft 25 that whilst the shaft 14 is being driven the shaft 12 remains stationary and vice vera.

The operation of the system will now be described. A series of crates 42 begins to travel along the conveyor run 1 and each in turn comes to rest against the stop rail 11. The shaft 12 then commences to rotate and the finger 13 pushes the leading end of the crate 42 clear of the stop rail 11 so that it can enter the section 4 by gravity. It is then carried forward by the lugs 10 on the chains 9 into the top compartment of the section 4 from which a crate has just been released. Movement of the chains 8 then ceases and the next crate on the conveyor run 1 comes to rest against the stop rail 11. The crate which has just been fed forward into the top compartment of the section 4 comes to rest against the stop 18. Rotation of the shaft 14 then commences and the crate which has just been introduced into the top compartment is brought successively to two positions at 120° apart where it is sprayed internally by the nozzles 20. It is then moved through a further 120° to the upright position. Meanwhile it has slid sideways across the compartment and is therefore clear of the stop 18 so that it is released from the compartment by gravity or by the pressure exerted by the crate behind it, thus reaching the run 2 whence it travels away by gravity.

Referring now to Figure 6 the section 3 is precisely similar to that already described but the section 4 has compartments which are more than twice the length of a crate and which are divided in the middle by a stop 43. Each crate entering a compartment travels across it into engagement with the stop 43 pushing out of it the crate in front of it which has just been released from engagement with the stop 18. When next the same compartment reaches the upright position the rearmost crate which has just been released from engagement with the stop 43 travels forward pushing out of the compartment the crate in front of it and then coming to rest in engagement with the stop 18 from which it is released during the next rotation of the compartment.

As illustrated the mechanism is suitable for the cleaning of empty crates and the top of each compartment is composed of a mesh or grating through which spray jets may operate.

The mechanism may, however, be used for many other purposes. Thus it may be employed for mixing cordials or other soft drinks. In this case the casing 19 and spray nozzles 20 need not be provided or, if provided, the spray nozzles are not in operation. Furthermore, it may be convenient that the top closure of each compartment shall be solid. The crates travelling along the conveyor are filled with bottles which have already been filled and corked, and which are inverted in two stages and reversed in the section 4 and then the filled crates travel away down the conveyor run 2.

It will also be appreciated that the device may be used for emptying crates full of bottles. In this case the section 4 is surrounded not by a casing as shown in Figure 4 but by a conveyor carrying cup-shaped elements each adapted to receive the neck of a bottle. The top closure of the compartments will then comprise in a preferred form wire or rod side rails spaced apart so as to retain the crate when inverted whilst permitting the bottles to fall out into the cup-shaped elements of the surrounding conveyor.

For convenience and balance the shaft 14 has been shown carrying three compartments. It will however be appreciated that the shaft 14 may carry two, four or any other number of compartments, the rotational movement of the shaft 14 being stopped at appropriate intervals.

I claim:

1. A conveyor system comprising a conveyor run, a shaft rotatable about an axis parallel to the length of the conveyor run, said shaft having an article container carried thereby, first stop means for stopping articles entering said container, means for rotating said shaft after an article has been stopped in said container by said first stop means, a chain conveyor for feeding articles from said conveyor run to said container, means to drive said chain conveyor, second stop means at the entrance to the chain conveyor from the conveyor run for stopping articles on said conveyor run, and means for simultaneously releasing an article from said second stop means and driving said chain conveyor.

2. A conveyor system as claimed in claim 1 in which said first stop means included a first stationary stop projecting partly across said container, articles being released from the first stop by sliding tangentially with respect to the axis of rotation of said shaft during the rotation thereof.

3. A conveyor system as claimed in claim 2 in which said second stop means includes a second stationary stop, and said releasing means includes means to push articles away from said second stop.

4. A conveyor system as claimed in claim 3, in which said first stop means is at the outlet of the container, having a third stop means intermediate the length of the container, said third stop means including a third stationary stop projecting partly across said container, articles being released from the third stop by sliding tangentially with respect to the axis of rotation of said shaft during the rotation thereof, said third stop being angularly displaced by a slight distance around the axis of rotation of the shaft from the first stop in a direction opposite from the direction of rotation of the shaft.

5. In a conveyor system as claimed in claim 4, a common power source for said chain conveyor and said shaft, and clutch means for alternately connecting the chain conveyor and the shaft to said power source.

6. A conveyor system as claimed in claim 1 in which said second stop means includes a second stationary stop, and said releasing means includes means to push articles away from said second stop.

7. A conveyor system as claimed in claim 6, in which said first stop means is at the outlet of the container, having a third stop means intermediate the length of the container, said third stop means including a third stationary stop projecting partly across said container, articles being released from the third stop by sliding tangentially with respect to the axis of rotation of said shaft during the rotation thereof.

8. In a conveyor system as claimed in claim 7, a common power source for said chain conveyor and said shaft, and clutch means for alternately connecting the chain conveyor and the shaft to said power source.

9. A conveyor system as claimed in claim 1, in which said first stop means is at the outlet of the container, having a third stop means intermediate the length of the container, said third stop means including a third stationary stop projecting partly across said container, articles being released from the third stop by sliding tangentially with respect to the axis of rotation of said shaft during the rotation thereof.

10. In a conveyor system as claimed in claim 9, a common power source for said chain conveyor and said shaft, and clutch means for alternately connecting the chain conveyor and the shaft to said power source.

11. In a conveyor system as claimed in claim 1, a common power source for said chain conveyor and said shaft, and clutch means for alternately connecting the chain conveyor and the shaft to said power source.

References Cited in the file of this patent

UNITED STATES PATENTS

| 1,212,723 | Williams | Jan. 16, 1917 |
| 2,215,735 | Jones | Sept. 24, 1940 |
| 2,610,725 | Schieser et al. | Sept. 16, 1952 |

FOREIGN PATENTS

| 22,396 | Great Britain | Dec. 6, 1892 |